United States Patent
Imaizumi

Patent Number: 5,731,905
Date of Patent: Mar. 24, 1998

[54] EYEPIECE LENS SYSTEM

[75] Inventor: Masaki Imaizumi, Hachioji, Japan

[73] Assignee: Olympus Optical Co., Ltd., Tokyo, Japan

[21] Appl. No.: 771,115

[22] Filed: Dec. 20, 1996

Related U.S. Application Data

[63] Continuation of Ser. No. 352,795, Dec. 1, 1994, abandoned.

[30] Foreign Application Priority Data

Dec. 1, 1993 [JP] Japan ................................. 5-325762

[51] Int. Cl.⁶ ........................................... G02B 25/00
[52] U.S. Cl. ........................................ 359/646; 359/794
[58] Field of Search ........................... 359/646, 645, 359/644, 794, 643

[56] References Cited

U.S. PATENT DOCUMENTS

| | | | |
|---|---|---|---|
| 3,888,567 | 6/1975 | Shoemaker | 359/645 |
| 3,994,570 | 11/1976 | Sussman | 359/646 |
| 4,099,842 | 7/1978 | Kaneko | 359/644 |
| 5,162,945 | 11/1992 | Matsuo et al. | 359/646 |
| 5,568,319 | 10/1996 | Kaneko et al. | 359/643 |

FOREIGN PATENT DOCUMENTS

| | | |
|---|---|---|
| 51-120231 | 10/1976 | Japan . |
| 60-227215 | 11/1985 | Japan . |
| 61-48810 | 3/1986 | Japan . |
| 63-318514 | 12/1988 | Japan . |
| 3-87709 | 4/1991 | Japan . |

*Primary Examiner*—David C. Nelms
*Assistant Examiner*—Dawn-Marie Bey
*Attorney, Agent, or Firm*—Cushman, Darby & Cushman IP Group of Pillsbury, Madison & Sutro LLP

[57] ABSTRACT

An eyepiece lens system comprising a first positive lens component and a second positive lens component: the first lens component being composed of a single positive lens element, and the second lens component being composed of a single cemented doublet consisting of a positive lens element and a negative lens element. This eyepiece lens system has distortion which is corrected favorably by selecting an adequate refractive power for a cemented surface of the cemented doublet and is configured so as to have a sufficiently long eyepoint distance.

7 Claims, 2 Drawing Sheets

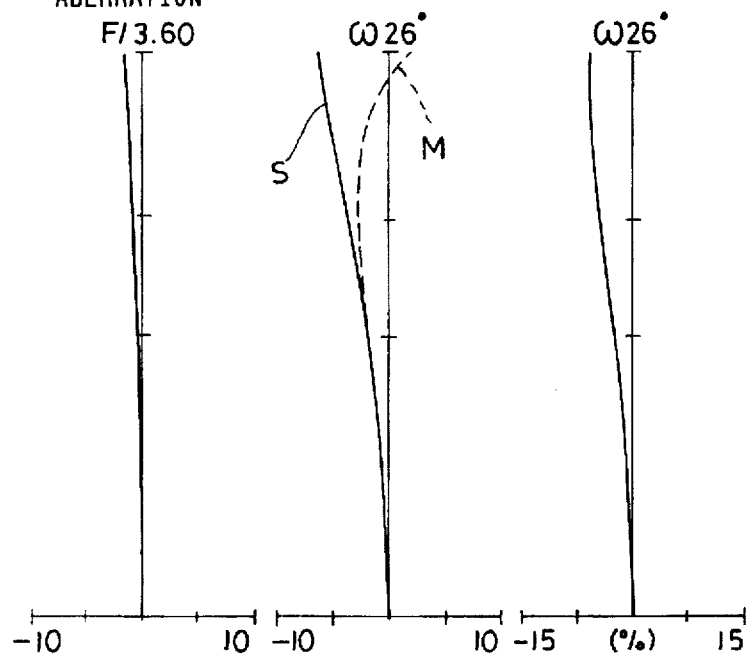
FIG. 3A SPHERICAL ABERRATION
FIG. 3B ASTIGMATISM
FIG. 3C DISTORTION
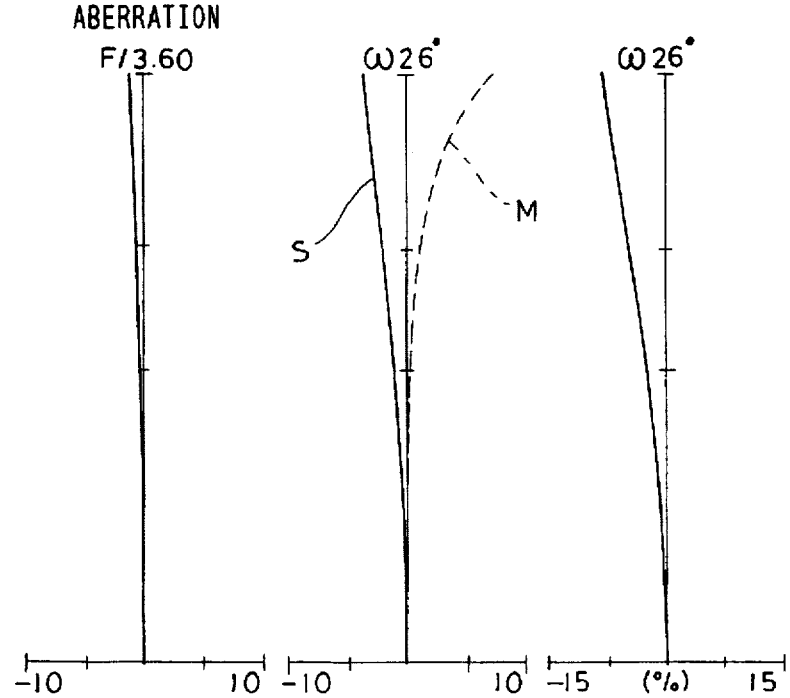
FIG. 4A SPHERICAL ABERRATION
FIG. 4B ASTIGMATISM
FIG. 4C DISTORTION

EYEPIECE LENS SYSTEM

This is a continuation of application Ser. No. 08/352,795, filed on Dec. 1, 1994, which was abandoned.

BACKGROUND OF THE INVENTION a) Field of the Invention

The present invention relates to an eyepiece lens system, and more specifically an eyepiece lens system which is to be used with binocular telescopes and the similar instruments.

b) Description of the Prior Art

As conventional examples of eyepiece lens systems each of which is composed of two lens components of three lens elements, there are known the lens systems disclosed by Japanese Patents Kokai Publication No. Sho 51-120,231 and Kokai Publication No. Hei 3-87,709.

Out of these conventional examples, the former is composed of the three lens elements as described above, uses no aspherical surface and features high productivity or low manufacturing cost. However, this eyepiece lens system has distortion as large as 8.8 to 9% at $2\omega=52°$ and an eyepoint distance on the order of 0.8% of a focal length of the eyepiece lens system as a whole, whereby the lens system is unusable as a compact eyepiece lens system for binocular telescopes and similar instruments.

Further, the latter of the above-mentioned conventional examples is also composed of the three lens elements but uses an aspherical surface. This eyepiece lens system adopts a synthetic resin material for a lens element having the aspherical surface for enhancing optical performance of the lens system while lowering a manufacturing cost therefor. However, the use of the synthetic resin material constitutes a cause for lowering of the optical peformance of the eyepiece lens system due to variations of temperature and humidity, and does not necessarily assure lowering of the manufacturing cost since the use of the synthetic resin material requires new investments in molding dies, molding machines and so on. In addition, this eyepiece lens system has an eyepoint distance 0.82 to 0.85 times as long as a focal lenght thereof, and is unusable as a compact eyepiece lens system for binocular telescopes and similar instruments.

Furthermore known as conventional examples of eyepiece lens systems each of which is composed of three lens elements are the lens systems disclosed by Japanese Patents Kokai Publication No. Sho 60-227,215, Kokai Publication No. Sho 61-48,810 and Kokai Publication No. 63-318,514.

However, all of these conventional examples have narrow field angles since the lens system disclosed by Japanese Patent Kokai Publication No. Sho 60-227,215 has a field angle $2\omega$ of 24.1° to 28.7°, the lens system dislcosed by Japanese Patent Kokai Publication No. Sho 61-48,810 has field angle $2\omega$ of 24.6° to 26.6° and the lens system disclosed by Japanese Patent Kokai Publication No. Sho 63-318,514 has a field angle $2\omega$ of 30°.

SUMMARY OF THE INVENTION

A primary object of the present invention is to provide an eyepiece lens system which has an apparent field angle on the order of 50°, produces distortion in a small amount, has a sufficiently long eyepoint distance, uses no aspherical surface and can be composed at a low cost of two lens components of three lens elements.

The eyepiece lens system according to the present invention consists of a first positive lens component and a second positive lens component: the first lens component being composed of a single positive lens element, and the second lens component being composed of a single cemented doublet consisting of a positive lens element and a negative lens element; and is configured so as to satisfy the following condition:

$$-5.3 < \{r_C/(n'-n)\}/f < -3.8$$

wherein the reference symbol $r_C$ represents a radius of curvature on a cemented surface of the cemented doublet, the reference symbols n and n' designate refractive indices of the lens elements disposed before and after respectively the cemented surface, and the reference symbol f denotes a focal length of the eyepiece lens system as a whole.

In an eyepiece lens system which is composed of two lens components of three lens elements like the lens system according to the present invention, all the surfaces other than the cemented surface have converging functions, whereby the lens system produces, due to the converging functions of the surfaces, distortion which strongly tends to be negative. For cancelling the distortion which tends to be negative, it is necessary to effectively utilize a diverging function of the cemented surface. Further, for prolonging an eyepoint distance of the eyepiece lens system it is effective to make full use of the diverging function of the cemented surface for the principal ray (a function which makes the principal ray leap up farther from an optical axis).

The condition mentioned above defines the diverging function of the cemented surface. If the upper limit of −3.8 of the condition is exceeded the cemented surface will have too strong a diverging function and the other surfaces will inevitably produce large amounts of aberrations for cancelling aberrations produced by the cemented surface, whereby aberrations will be unbalanced in the eyepiece lens system as a whole. If the lower limit of −5.3 of the condition is exceeded, in contrast, the cemented surface will have a weak diverging function and produce distortion in a large amount. In this case, it will be impossible to configure an eyepiece lens system which has a sufficiently long eyepoint distance.

BRIEF DESCRIPTION OF THE DRAWINGS

FIG. 3A, FIG. 3B and FIG. 3C show graphs visualizing aberration characteristics of the first embodiment of the present invention; and FIG. 4A, FIG. 4B and FIG. 4C show graphs visualizing aberration characteristics of the second embodiment of the present invention.

DETAILED DESCRIPTION OF THE PREFERRED EMBODIMENTS

Now, the eyepiece lens system according to the present invention will be described in more detail below with reference to the preferred embodiments illustrated in the accomanying drawings and given in the form of the numerical data listed below:

Embodiment 1

$f = 100$, F number = 3.6, $2\omega = 52°$

| | | |
|---|---|---|
| $r_1 = 5017.56$ | | |
| $d_1 = 44.07$ | $n_1 = 1.51633$ | $v_1 = 64.15$ |
| $r_2 = -92.38$ | | |
| $d_2 = 2.03$ | | |
| $r_3 = 116.76$ | | |
| $d_3 = 71.4$ | $n_2 = 1.58913$ | $v_2 = 61.18$ |
| $r_4 = -83.64$ | | |
| $d_4 = 10.58$ | $n_3 = 1.80518$ | $v_3 = 25.43$ |
| $r_5 = -550.15$ | | |

$\{r_c/(n' - n)\}/f = -3.87$ eyepoint distance = 97, distortion = $-5.7\%$ ($2\omega = 52°$)

Embodiment 2

$f = 100$, F number = 3.6, $2\omega = 52°$

| | | |
|---|---|---|
| $r_1 = 353.82$ | | |
| $d_1 = 35.25$ | $n_1 = 1.58913$ | $v_1 = 61.18$ |
| $r_2 = -121.56$ | | |
| $d_2 = 2.20$ | | |
| $r_3 = 123.22$ | | |
| $d_3 = 52.88$ | $n_2 = 1.62041$ | $v_2 = 60.06$ |
| $r_4 = -97.52$ | | |
| $d_4 = 10.58$ | $n_3 = 1.80518$ | $v_3 = 25.43$ |
| $r_5 = \infty$ | | |

$\{r_c/(n' - n)\}/f = -5.28$ eyepoint distance = 97, distortion = $-7.9\%$ ($2\omega = 52°$)

wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represent Abbe's numbers of the respective lens elements.

Figure 1:
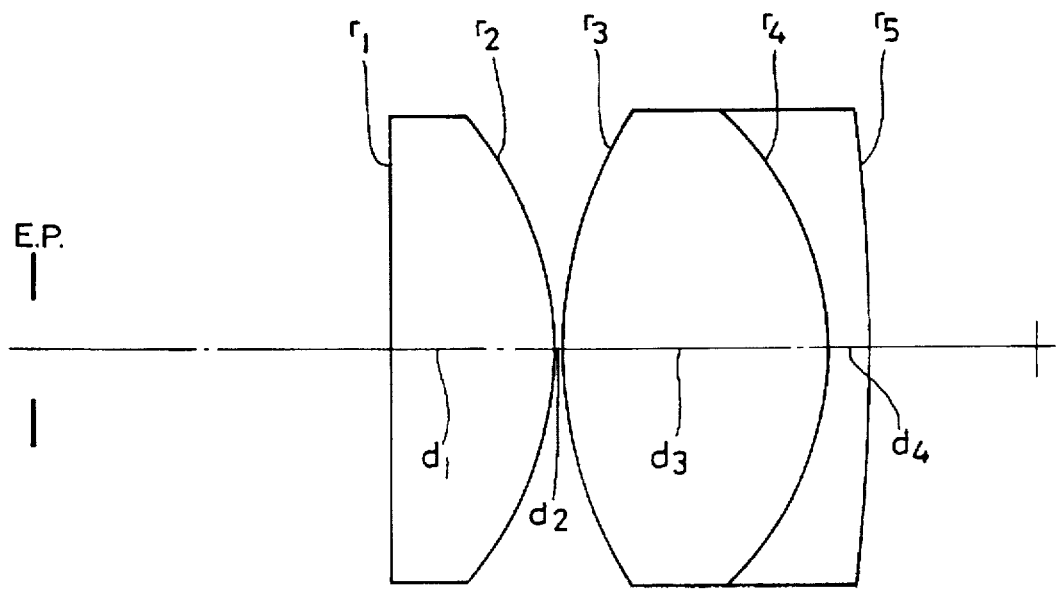
FIG. 1 shows a sectional view illustrating a composition of a first embodiment of the eyepiece lens system according to the present invention.
Figure 2:
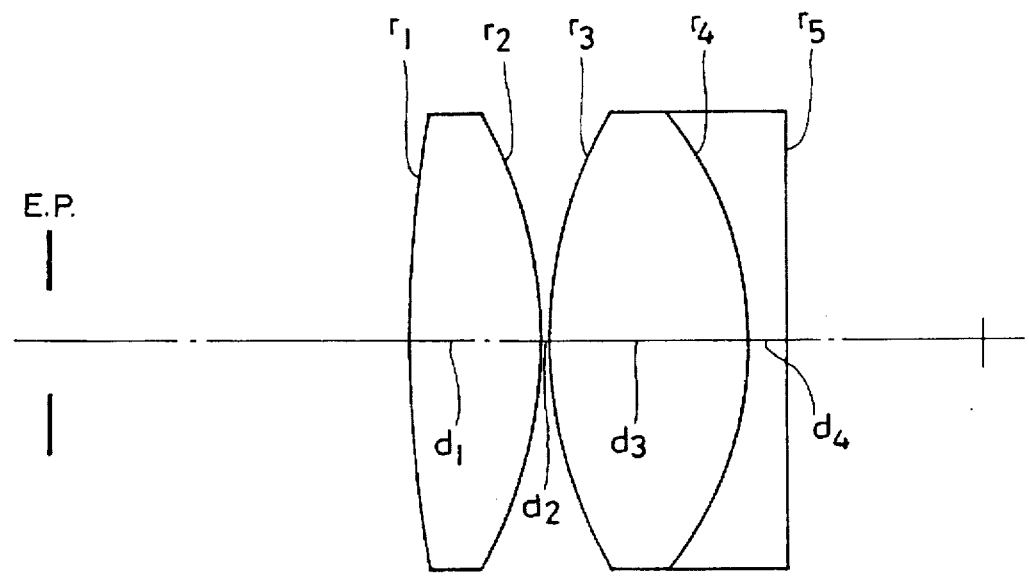
FIG. 2 shows a sectional view illustrating a compostion of a second embodiment of the eyepiece lens system according to the present invention.

The first embodiment and the second embodiment of the present invention have the compositions illustrated in FIG. 1 and FIG. 2 respectively, wherein lens surfaces are disposed in order of $r_1, r_2, \ldots$ from the side of the eyepoints E.P.'s. The first embodiment of the present invention has the aberration characteristics illustrated in FIG. 3A, FIG. 3B and FIG. 3C, whereas the second embodiment of the present invention has the aberration characteristics visualized in FIG. 4A, FIG. 4B and FIG. 4C. The curves illustrating these aberration characteristics were traced on an assumption that rays were incident from the sides of the eyepoints E.P.'s for imaging.

The eyepiece lens system according to the present invention has distortion smaller than $-8\%$, an eyepoint distance, which is sufficiently long or 0.97 times as long as a focal length thereof and a compact size, is usable with compact binocular telescopes and the similar instruments, and can be composed at a low cost of ordinary polished lens elements.

We claim:

1. An eyepiece lens system, in order from an eyepoint side to an object side, comprising:

a first positive lens component; and a second positive lens component, said first lens component consisting of a single positive lens element, said second lens component consisting of a single cemented doublet consisting of a positive lens element on the eyepoint side and negative lens element on the object side, every lens element of said eyepiece lens system having only substantially spherical lens surfaces, and said eyepiece lens system configured so as to satisfy the following condition:

$$-5.3 < \{r_c/(n'-n)\}/f < -3.8$$

wherein the reference symbol $r_c$ represents a radius of curvature on a cemented surface of said cemented doublet, the reference symbols n and n' designate refractive indices of the lens elements disposed before and after, respectively, said cemented surface, and the reference symbol f denotes a focal length of said eyepiece lens system as a whole.

2. An eyepiece lens system, in order from an eyepoint side to an object side, consisting of:

a first positive lens component; and a second positive lens component, said first lens component consisting of a single positive lens element, said second lens component consisting of a single cemented doublet consisting of a positive lens element on the eyepoint side and negative lens element on the object side, and said eyepiece lens system configured so as to satisfy the following condition $$-5.3 < \{r_c/(n'-n)\}/f < -3.8$$

wherein the reference symbol $r_c$ represents a radius of curvature on a cemented surface of said cemented doublet, the reference symbols n and n' designate refractive indices of the lens element disposed before and after, respectively, said cemented surface, and the reference symbol f denotes a focal length of said eyepiece lens system as a whole.

3. An eyepiece lens system according to claim 2, wherein every lens element of said eyepiece lens system has only substantially spherical lens surfaces.

4. An eyepiece lens system, in order from an eyepoint side to an object side, comprising:

a first positive lens component; and a second positive lens component, said first lens component comprising a single positive lens element, said second lens component comprising a single cemented doublet consisting of a positive lens element on the eyepoint side and negative lens element on the object side, the most object side surface of said second lens component is arranged as a plane surface or arranged to be convex toward said object side; and said eyepiece lens system is configured so as to satisfy the following condition:

$$-5.3 < \{r_c/(n'-n)\}/f < -3.8$$

wherein the reference symbol $r_c$ represents a radius of curvature on a cemented surface of said cemented doublet, the reference symbols n and n' designate refractive indices of the lens elements disposed before and after, respectively, said cemented surface, and the reference symbol f denotes a focal length of said eyepiece lens system as a whole, and the most object side surface of said second lens component is arranged as a plane surface or arranged to be convex toward said object side.

5. An eyepiece lens system, in order from an eyepoint side to an object side, comprising:

a first positive lens component; and a second positive lens component, said first lens component comprising a single positive lens element, said second lens component comprising a single cemented doublet consisting of a positive lens element on the eyepoint side and negative lens element on the object side, said cemented doublet of said second lens component being composed of a biconvex lens and a negative meniscus lens; and said eyepiece lens system configured so as to satisfy the following condition:

$$-5.3 < \{r_c/(n'-n)\}/f < -3.8$$

wherein the reference symbol $r_c$ represents a radius of curvature on a cemented surface of said cemented doublet, the reference symbols n and n' designate refractive indices of the lens elements disposed before and after, respectively, said cemented surface, and the reference symbol f denotes a focal length of said eyepiece lens system as a whole.

6. An eyepiece lens system, in order from an eyepoint side to an object side, consisting of:

a first positive lens component; and a second positive lens component, said first lens component comprising a single positive lens element, said second lens component comprising a single cemented doublet consisting of a positive lens element on the eyepoint side and negative lens element on the object side, the most object side surface of said second lens component is arranged as a plane surface or arranged to be convex toward said object side; and said eyepiece lens system configured so as to satisfy the following condition:

$$-5.3 < \{r_c/(n'-n)\}/f < -3.8$$

wherein the reference symbol $r_c$ represents a radius of curvature on a cemented surface of said cemented doublet, the reference symbols n and n' designate refractive indices of the lens element disposed before and after, respectively, said cemented surface, and the reference symbol f denotes a focal length of said eyepiece lens system as a whole.

7. An eyepiece lens system, in order from an eyepoint side to an object side, consisting of:

a first positive lens component; and a second positive lens component, said first lens component comprising a single positive lens element, said second lens component comprising a single cemented doublet consisting of a positive lens element on the eyepoint side and negative lens element on the object side, said cemented doublet of said second lens component is comprised of a biconvex lens and a negative meniscus lens; and said eyepiece lens system is configured so as to satisfy the following condition $$-5.3 < \{r_c/(n'-n)\}/f < -3.8$$

wherein the reference symbol $r_c$ represents a radius of curvature on a cemented surface of said cemented doublet, the reference symbols n and n' designate refractive indices of the lens element disposed before and after, respectively, said cemented surface, and the reference symbol f denotes a focal length of said eyepiece lens system as a whole.

* * * * *